Jan. 3, 1933.  M. E. STALEY  1,892,858
THERMOSTATIC ELECTRIC SWITCH
Filed Sept. 3, 1929  2 Sheets-Sheet 1
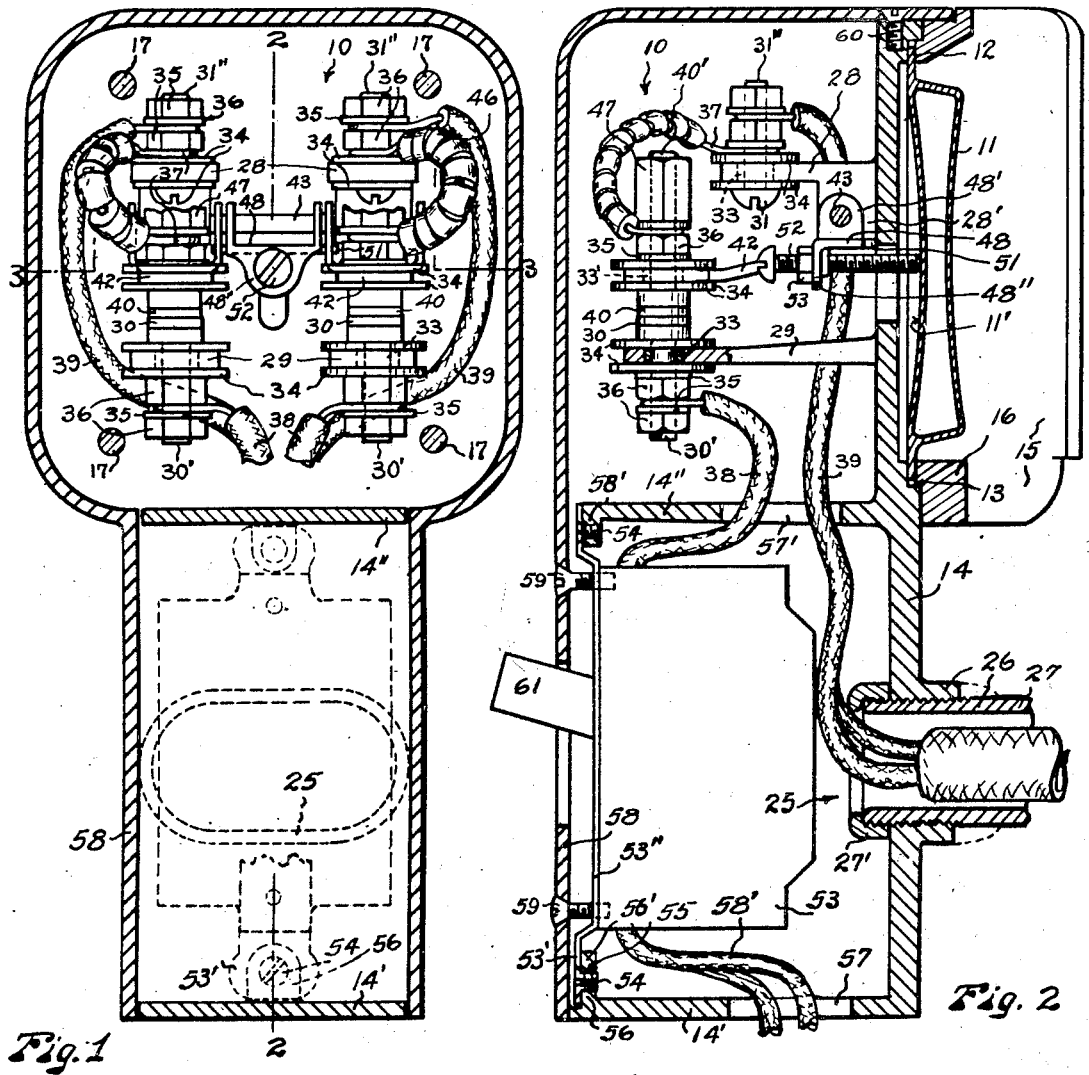
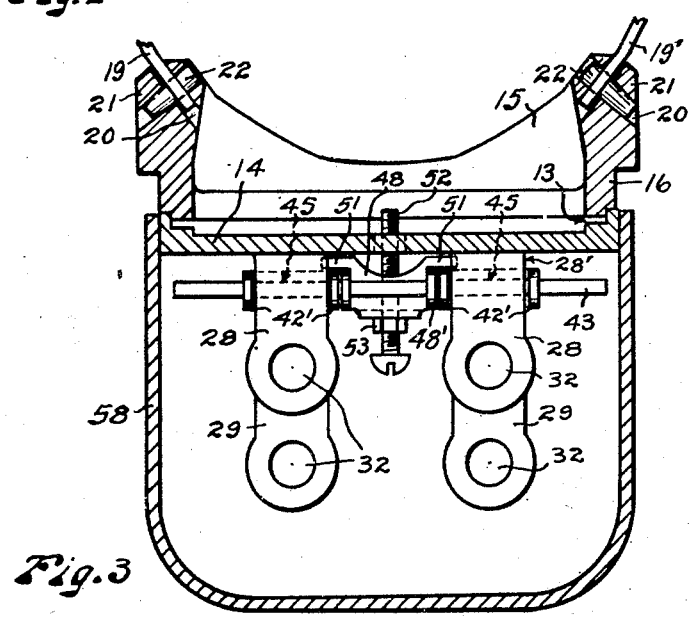
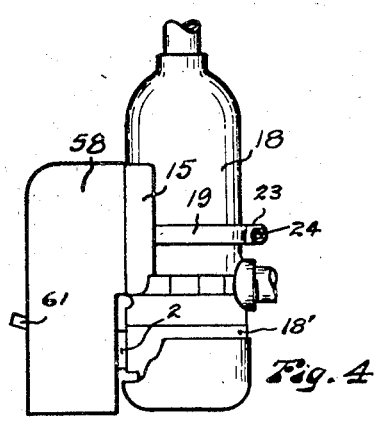
INVENTOR
*Miles E. Staley*
BY
*Fred C. Matheny*
ATTORNEY Jan. 3, 1933.  M. E. STALEY  1,892,858

THERMOSTATIC ELECTRIC SWITCH

Filed Sept. 3, 1929  2 Sheets-Sheet 2

INVENTOR
Miles E. Staley
BY
Fred C. Matheny
ATTORNEY

Patented Jan. 3, 1933

1,892,858

UNITED STATES PATENT OFFICE

MILES E. STALEY, OF TACOMA, WASHINGTON, ASSIGNOR TO RED SPOT ELECTRIC CO. INC., OF TACOMA, WASHINGTON, A CORPORATION OF WASHINGTON

THERMOSTATIC ELECTRIC SWITCH

Application filed September 3, 1929. Serial No. 389,950.

This invention relates to improvements in electric switches adapted to be operated by the rise and fall of the temperature of electric water heaters, hot water storage tanks and other apparatus in connection with which the switch is arranged to operate.

When electric heaters in connection with suitable storage tanks are used as the source of hot water supply for domestic and other purposes; a serious hazard incident thereto is the over heating of the storage water which often results in the production of steam and the backing up of the water past the water meter which is usually ruined thereby; and it is common knowledge that even more serious results have been experienced by negligent or careless persons who have failed to disconnect their heaters when the storage tank was filled with hot water.

The object of this improvement is to provide a thermostat electric switch that is adapted to automatically disconnect electrical heating devices when predetermined temperatures produced by the same are exceeded; and to automatically connect said devices when said temperatures are not exceeded.

Another object is to provide a switch of the class described that is simple and rugged in construction and reliable in its operation.

A further object is to provide a thermostat electric switch that will respond quickly to variations in the temperature of the object on which it is installed.

A still further object is to provide a thermostat switch that is easy to install and to adjust in order to compensate for the wear of the contacts.

A final object is to provide a switch of the kind described that is readily adaptable to a wide range of uses without change in the working elements of the switch mechanism.

Other objects of the invention will be apparent from the following detailed description of a preferred form of the invention which is clearly illustrated in the accompanying drawings, in which:

Fig. 1 is a vertical section through the enclosing cover with the line switch removed showing the front elevation of the thermostat switch mechanism.

Fig. 2 is a sectional side elevation taken on broken line 2—2 of Fig. 1.

Fig. 3 is a sectional plan view of the mechanism taken on line 3—3 of Fig. 1.

Fig. 4 is a side elevation of the device installed in connection with a circulation type electric water heater.

Figure 5:
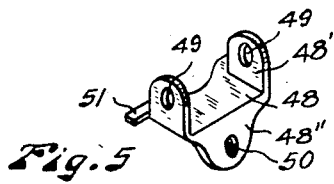
Fig. 5 is a detached perspective view of the switch actuating yoke.
Figure 6:
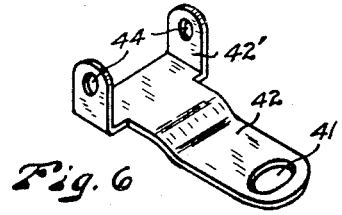
Fig. 6 is a detached perspective view of the movable switch contact arm.

Like reference numerals are used to indicate like parts throughout the drawings in which 10 is the thermostat electric switch mechanism proper which is adapted to be actuated by what is known in the art as an ether cell 11. The cell 11 has an annular flange 12 that fits snugly in an annular recess 13 in the rearward side of a base frame 14 to which the ether cell is clamped by means of a subbase 15, having a corresponding annular projection 16 and screws 17. The subbase is of such shape and proportion as to facilitate the mounting of the switch directly on the housing of a circulation type electric water heater 18 by means of clamping straps 19 secured at one end in slot 20 of subbase lugs 21, preferably by means of taper pins 22. The other ends 23 of the straps 18 are bent outwardly and drilled to receive a bolt 24 which is used to clamp the subbase securely to the heater or other device as shown clearly in Figs. 4 and 8.

An oval aperture 25 in base 14 surrounded by a wall 26 so shaped at its outward edge as to fit snugly against base 18' of the heater, is adapted to receive one end of conduit nipple 27 the other end of which is screwed into a threaded aperture in the base of the heater. A standard conduit bushing 27' is used as an additional means of removably securing the thermostat switch to the heater.

The switch mechanism of the device is mounted on projections 28 and 29 normal to the upper portion of base 14 as shown clearly in Fig. 2. The lower stationary contacts 30 and terminal screws 31 pass through cylindrical apertures 32 in projections 28 and 29 and are insulated therefrom preferably by means of mica sleeves 33 and mica washers 34. Metal washers 35 and nuts 36 serve to secure contacts 30 in position and to connect one end of flexible conductors 37 to terminal screws 31. The projecting threaded portions 30' and 31' of contacts 30 and 31 respectively together with washers 35 and nuts 36' serve as terminals to electrically connect conductors 38 and 39 of the circuit to be controlled.

The movable contacts 40 of the switch are mounted in apertures 41 on movable contact arms 42 and electrically insulated therefrom preferably by mica insulating sleeve 33' and mica washers 34; metal washers 35 and nuts 36 on the threaded projections 40' of the contacts serving to clamp the contacts and insulating elements firmly to movable arms 42 as seen best in Figs. 1 and 2.

Arms 42 and the appended movable contacts are pivotally mounted on pin 43 which passes through holes 44 in the up-turned lugs 42' of the arms and through holes 45 in lugs 28' of base 14. The length of the arms is such that the contact faces of the movable contacts register accurately with contact faces of stationary contacts 30. These contact faces are preferably of a special composition known in the art as Hardy metal.

Flexible conductors 37 are electrically insulated by means of glazed porcelain beads 46, and their remaining ends are connected to movable contacts 40 by means of metal washers 35 and special nuts 47. These serve also as weights to load the movable arms so the force of gravity will assure the closing of the electric circuit through contacts 30 and 40.

A pressed metal yoke 48 having upturned ends 48' with aligned holes 49 and a down turned lug 48" with tapped hole 50, is provided with side projections 51 which engage the rearward edge of the inner upturned lugs 42' of contact arms 42 when pivotally mounted in position on pin 43 as shown clearly in Figs. 1 and 3. A screw 52 is so adjusted in tapped hole 50 of the yoke that with its end bearing against the concaved snap plate 11' of ether cell 11, the projections 51 of yoke 48 will be a short distance from but not touching lugs 42' of arms 42 when contacts 30 and 40 are closed. The adjustment thus secured is maintained by tightening lock nut 53 against lug 48".

The upturned end 14' and partition wall 14" of base 14 together with the side walls of metal cover 58 form a switch box or compartment in which a standard double pole single throw indicating switch 53" is mounted by means of screws 54 passing through holes provided in ears 53' and engaging tapped holes 55 in lugs 56. Aperture 57 is adapted to receive the end of the run of conduit, not shown, through which insulated circuit conductors 58' are drawn in the usual way. These conductors are connected to the lower terminals, not shown, of switch 53. The upper terminals of the same are connected to conductors 38 which pass through aperture 57' and in turn connect to terminals 30' of lower contacts 30 as previously described. Conductors 39 connecting to terminals 31' of the switch mechanism also pass through aperture 57' and through nipple 27 in the base casting to the terminals of the heater or other device to be controlled.

After the switch has been installed and adjusted as described cover 58 is removably secured in position by means of screws 59 which engage the tapped holes in the metal strip 53" of switch 53. These screws are regularly employed to secure the metal cover plate in position after the switch is mounted in a metal box. Supplementing screws 59 is a screw 60 which engages a tapped hole in the top of base casting 14 as seen best in Fig. 2.

As will be seen in the drawings, the several elements of the device are in the positions required for a flow of current from conductors 58' through circuit control switch 53, through conductors 38 thence through the insulated terminals, contacts and other parts of the thermostat switch mechanism 10 to conductors 39 connected to the heating element of the water heater.

Obviously the flow of current may be broken manually by depressing handle 61 of switch 53 thus throwing the switch to the off position when the required quantity of hot water has been obtained. In case the current inadvertently should be left on, or in case it is desired to completely fill the storage tank with hot water, the current will continue to flow after the circuit is closed until the water in the heater raises to the temperature at which ether cell 11 is designed to operate. When that temperature is reached plate 11' snaps to its outward position due to the increased vapor pressure within the cell thus breaking the connection between contacts 30 and 40 due to the upward movement of the movable contacts 40 resulting from the operation of the coacting mechanism as previously described.

It will be noted in Fig. 2, that the rearward or cupped portion of ether cell 11 is adapted to be mounted in close proximity to the wall of the water heater, thus enabling it to respond quickly to the variations in temperature. This greatly reduces the time lag between the occurrence of the critical temperatures and the operations of the thermostat switch, as compared with other devices heretofore used for this purpose. This is an important feature of the invention.

Figure 8:
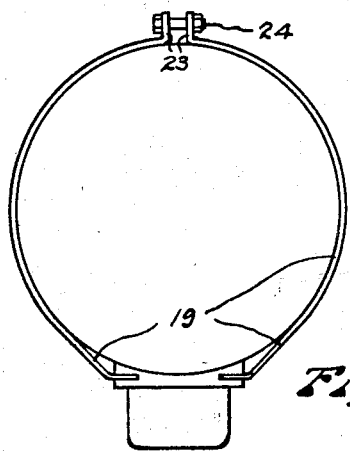
Fig. 8 is an exterior plan view of the device installed on such a tank.
Figure 7:
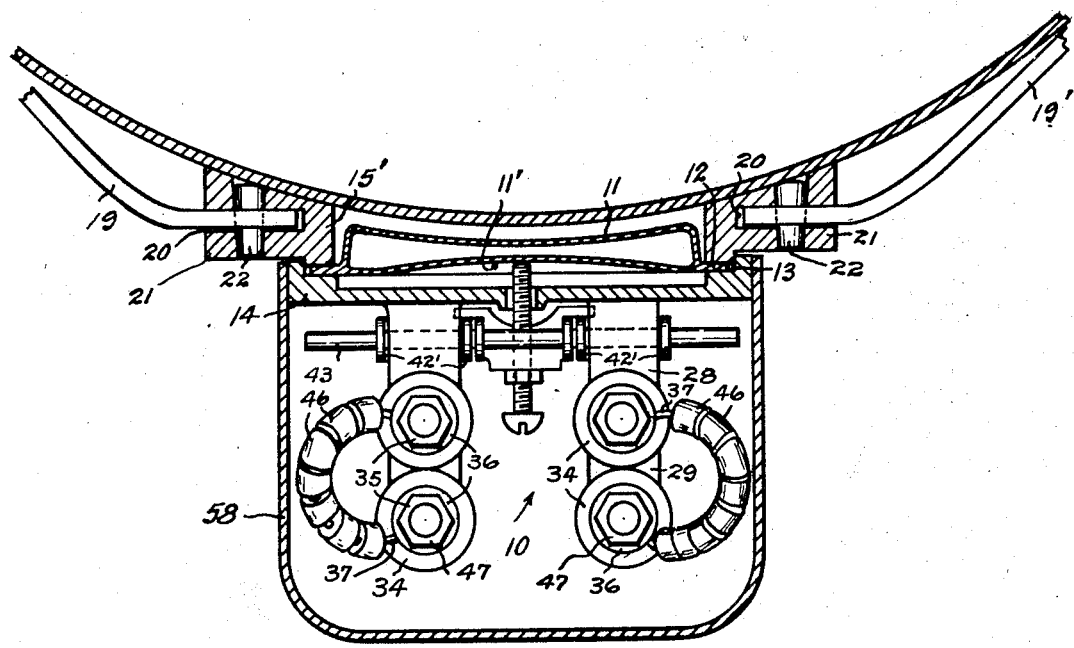
Fig. 7 is a transverse sectional view through the supporting base and housing of the device in a form adapted for installation in connection with hot water storage tanks and the like, disclosing a plan view of the thermostat switch mechanism.

By substituting a subbase 15' of different curvature and using longer clamping straps 19', the device may be mounted at any convenient elevation directly on the hot water storage tank or other container, as shown clearly in Figs. 7 and 8; and a wide range of operating temperature limits are made possible by substituting ether cells designed to operate at the temperature desired within the range of possibilities of this type of equipment. It is obvious that a wide variety of adaptations and operating temperatures are thus made both possible and practical without changing the construction of the principal parts of the device.

My invention is not necessarily limited to the details of construction shown and described in this specification, as the invention may be employed in other forms that would suggest themselves to those skilled in the art without departing from the spirit of the invention.

Having thus described my invention, what I claim and desire to have protected by Letters Patent is:

1. A thermosatic electric switch embodying a base frame, a subbase secured to said base frame, means for securing the subbase and the base frame to an object of variable temperature, a thermostat cell held between the subbase and the base frame in close proximity to the object and responsive to variations in temperature of the object, a cover cooperating with said base frame to form a housing having an upper and a lower compartment, switch means in the upper compartment acactuated by said thermostat, and manually controlled switch means in the lower compartment in series connection with said switch means in said upper compartment.

2. A thermostatic electric switch, embodying a vertically disposed frame base, horizontal integral fixed supports extending outwardly from said frame base, fixed contact members carried by said fixed supports, horizontal movable contact members pivoted on said frame base, an ether filled thermostat cell secured to said frame base, and means pivoted on said frame base for transmitting the snapping movement of said thermostat cell to said movable contact members for moving the same to make and break contact with said fixed contact members.

3. A thermostatic electric switch embodying a vertically disposed frame base, an upper and a lower set of fixed horizontal integral supports extending outwardly from said frame base, fixed contact members carried by said lower set of fixed supports, horizontal movable contact members pivoted on said frame base and arranged to make and break contact with said fixed contact members, a thermostat cell for operating said movable contact members, terminal means secured to said upper set of fixed supports, flexible conductors connecting said terminal means and said movable contact members.

4. A thermostatic electric switch embodying a vertically disposed frame base, horizontal fixed supports extending outwardly from said frame base, contact members on said fixed supports, a pivot pin mounted in the frame base and extending crosswise thereof above said fixed supports, an actuating member mounted on said pivot pin, a screw adjustable in said actuating member and extending rearwardly through said frame base, a thermostat cell engaged by the rear end of said screw, horizontal movable contact arms supported on said pivot pin on each side of said actuating member and arranged to be engaged and moved by said actuating member and contact members on the outer ends of said movable contact arms.

5. A thermostatic electric switch embodying a vertically disposed frame base, horizontal fixed supports extending outwardly from said frame base, contact members supported on and insulated from said fixed supports, a pivot pin mounted in the frame base and extending crosswise thereof above said fixed supports, an actuating member mounted on said pivot pin, a screw adjustable in said actuating member and extending rearwardly through said frame base, a thermostat cell secured to the frame base and arranged to be engaged by the rear end of said screw, means securing the frame base to an object of variable temperature with the cell in close proximity to the object, horizontal movable contact arms supported on said pivot pin on each side of said actuating member, lugs on the actuating member arranged to engage and lift said contact arms, contact members on the outer ends of said movable contact arms arranged to engage said fixed contact members, and weights for lowering the outer ends of said movable contact arms.

6. A thermostatic switch embodying a vertically disposed frame base, a subbase secured to said frame base, a thermostat cell supported between the subframe and the frame base and having a disc like side capable of snapping inwardly and outwardly in response to changes of temperature, screw means engaging the movable side of said cell and extending through said frame base, a member pivoted on said frame base and supporting said screw, horizontal pivoted switch arms engaged by said member and arranged to be lifted thereby, movable electrical contacts carried by the outer ends of said pivoted arms, and fixed contacts arranged to be engaged by said movable contacts.

7. A thermostatic switch, embodying a vertically disposed frame base, a subbase secured to said frame base, a thermostat cell supported between the subbase and the frame base, and having a disc like side capable of snapping inwardly and outwardly in response to changes of temperature, screw means engaging the movable side of said cell and extending through said frame base, a member pivoted on said frame base and supporting said screw, horizontal pivoted switch arms engaged by said member and arranged to be lifted thereby, movable electrical contacts carried by the outer ends of said pivoted arms, fixed contacts arranged to be engaged by said movable contacts, fixed terminal means on the base plate, and flexible conductors connecting the movable contacts with the fixed terminal means.

8. A thermostatic electric switch embodying a subbase having a thermostat aperture of relatively large size capable of receiving a thermostat extending therethrough, means for securing said subbase to a receptacle for fluid of varying temperature, a base frame removably secured to said subbase, a thermostat cell in said aperture in close proximity to the surface of said receptacle and supported by clamping between said subbase and said base frame, an electric switch mounted on said base frame, and means for the operation of said switch by said thermostat cell.

9. A thermostatic electric switch embodying a subbase having a thermostat aperture of relatively large size capable of receiving a thermostat extending therethrough, means for securing said subbase to a receptacle for fluid of varying temperature, a flanged thermostat cell in said aperture in close proximity to the surface of said receptacle, a base frame removably secured to said subbase and arranged to clamp the flange of said thermostat cell to said subbase, an electric switch mounted on said base frame, and means for the operation of said switch by said thermostat cell.

The foregoing specification signed at Seattle, Washington, this 22nd day of August 1929.

MILES E. STALEY.